May 3, 1949.  H. L. MEKELBURG  2,468,888
METAL-BACKED NONWELDING CONTACT
Filed Sept. 25, 1944
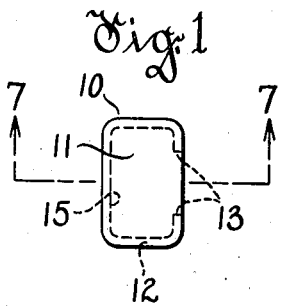
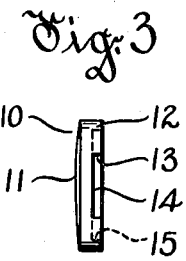
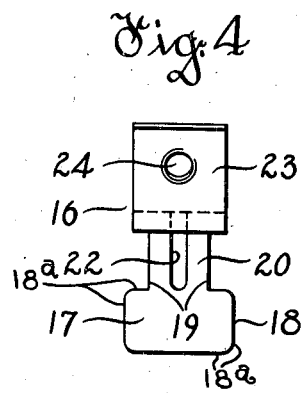
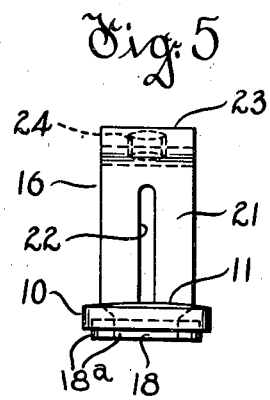
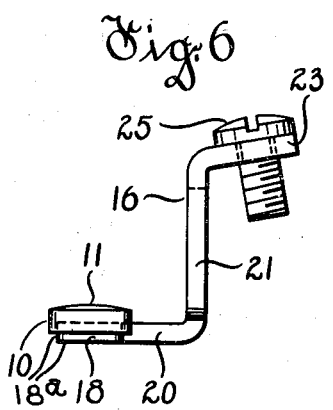
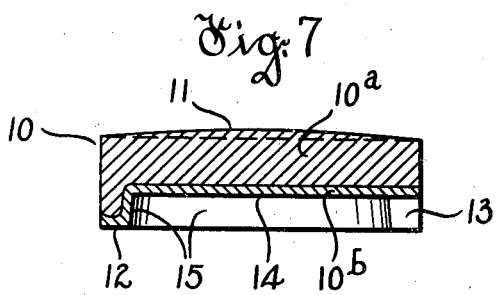
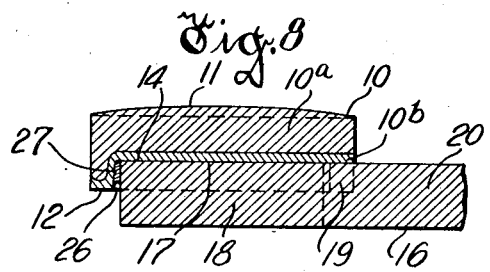
Inventor
Harold L. Mekelburg
By Frank H. Hubbard
Attorney Patented May 3, 1949

2,468,888

UNITED STATES PATENT OFFICE 2,468,888

METAL-BACKED NONWELDING CONTACT

Harold L. Mekelburg, Milwaukee, Wis., assignor to Cutler-Hammer, Inc., Milwaukee, Wis., a corporation of Delaware Application September 25, 1944, Serial No. 555,646

10 Claims. (Cl. 200—166)

This invention relates to improvements in metal-backed non-welding contacts, and more particularly to means for protecting the non-welding surface portions thereof from contamination by associated material employed to weld or braze the same to a suitable support.

The invention is especially applicable to and advantageous for that type of contact which is molded from powdered materials to provide a preform, which preform is heat-sintered and then finally molded under heavy pressure to the desired shape and dimensions. Preferably such contact consists of a relatively thick layer of silver-base material having non-welding characteristics when in use, and a relatively thin layer of fine silver integrally united with the aforementioned layer to enable attachment of the contact to a metal support of good electrical conductivity by the usual welding or brazing operation. When brazing the contact to the support a suitable brazing material is preferably interposed between the layer of fine silver and the support. In some cases and under certain conditions, however, the brazing material may be omitted; fusing of the fine silver backing being effected to provide for uniting or attachment of the contact to its support. In the latter case a suitable flux is usually employed merely to prevent oxidation of the two metals (fine silver of the backing, and brass or the like of the support).

Such contacts are seriously impaired if during welding or brazing the fine silver of the backing or the brazing material (which is likewise highly conducting) flows onto the contact surface or the peripheral edge of the layer of non-welding material affording the contact surface, and attachment of such contacts has heretofore required great care in order to avoid an excessive number of "rejects," or defective contacts. The fine silver backing must be confined to the back or attaching end of the contact in forming the latter; and both the fine silver backing and the brazing material (if employed) must be so confined during the attaching operation. Moreover, it is highly important to insure against the edges of the contact warping or curling away from the contact support through inadequate bonding with the latter. Difficulty in the latter respect has been experienced and it has been found that such curling of the edges of the contact tends greatly to curtail contact life, for obvious reasons.

Overcoming of the difficulties aforeindicated is a primary object of the invention; and other objects include accomplishment of the foregoing object in a way such as to be economical and to afford additional advantages including the self-alining or self-centering characteristic of certain earlier forms of contacts.

According to the present invention it is proposed to so form the contact and its support as to provide a partially confining space or receptacle around the usual area of attachment between said parts, to which space the excess of fine silver or brazing material will flow when fused and in which such excess will be completely or substantially completely accommodated when the welding or brazing operation is performed. Preferably the contact is provided with an integral depending skirt or flange to fit over a suitably formed supporting element with sufficient clearance to afford the aforementioned space for the excess of fused material, the skirt preferably being in part (the outer, upper peripheral part) of the same composition as the main body of the contact, and at least the inner peripheral surface of such skirt having such layer of fine silver formed integrally therewith. The skirt is preferably made to fit the support as closely as it can be and yet provide the aforementioned space for flowing material, and said skirt is preferably made as nearly continuous as can be conveniently done. However, it has been found in practice that complete continuity of the skirt is not essential; the embodiment of the invention herein illustrated having been highly successful in accomplishing the aforestated objects.

In the prior patent of Merle R. Swinehart, No. 2,425,053, dated August 5, 1947, (and assigned to the same assignee as the present application) silver-backed non-welding contacts and methods of making the same are disclosed and broadly claimed. Also in said Patent No. 2,425,053 there is specifically shown (Figs. 11 to 18) but not claimed a skirted silver-backed non-welding contact of the particular type herein disclosed and claimed.

The accompanying drawings illustrate the preferred form of my invention; it being understood that the invention is susceptible of embodiment in other forms without departing from the scope of the appended claims.

In the drawings,

Figure 1 is an enlarged top plan view of a skirted fine-silver-backed non-welding contact constructed or formed in accordance with my invention, the skirt or depending flange being shown in dotted lines.

Fig. 2 is an end elevation of the contact shown in Fig. 1.

Fig. 3 is a side elevational view of said contact.

Fig. 4 is a top plan view of a combined stationary metal support and wiring terminal to which the contact of Figs. 1 to 3 is adapted to be attached.

Fig. 5 is a front elevational view of the metal member shown in Fig. 4, but with the contact secured in position on the support by welding or brazing.

Fig. 6 is an elevational view at right angles to that of Fig. 5.

Fig. 7 is a greatly enlarged section, on the line 7—7 of Fig. 1, and

Fig. 8 is a view similar to Fig. 7, but showing the contact attached to the support.

The fine-silver-backed non-welding contact 10 is of approximately rectangular contour (Fig. 1), and the same has a slightly convex contact face 11. Contact 10 is provided with a skirt or depending flange 12 forming an extension of one long side and the two short sides of the contact, but being omitted at an intermediate portion of the length of the other long side thereof, as indicated at 13 (see Figs. 1, 3 and 7). The fine silver backing is preferably embodied in the flat inner surface 14 of the contact and the inner surface 15 of the aforementioned skirt 12. Contact 10 is produced in accordance with one or another of the methods disclosed in said Patent No. 2,425,053. That is to say, the layers of non-welding contact material 10ᵃ and fine silver 10ᵇ (Fig. 7) are molded into a unitary preform which is heat-sintered and then molded to the final form illustrated under a pressure of approximately 100,000 pounds per square inch. It will be noted from Fig. 7 that the inner surface 15 of the skirt or flange 12 has a slight incline outwardly towards its lower edge.

Contact 10 is adapted to be rigidly and permanently attached by welding or brazing to a combined metal support and wiring terminal member 16 (Figs. 4 to 6). Thus the flat inner surface 14 of contact 10 is adapted to seat against the upper surface 17 of the correspondingly shaped portion 18 of the support. The inner surface 15 of flange 12 surrounds the peripheral edges 18ᵃ of portion 18; the portion of flange 12 omitted at 13 being adapted to accommodate the reduced portion or neck of said support at 19 in Fig. 4. As hereinbefore stated, the skirt or flange 12 has clearance from the support to afford space for the excess fused material, and as will be apparent such space is that bounded by the slightly inclined surface 15 of skirt 12 and the peripheral edges 18ᵃ of portion 18 of the support. In other words, the parts 15 and 18ᵃ having clearance therebetween provide a receptacle 15—18ᵃ. In attaching contact 10 to portion 18 of the support by brazing I prefer to interpose between the adjacent surfaces of the two parts a thin sheet or plate of a suitable brazing material or hard solder, as aforementioned. Alternatively a suitable flux may be interposed between the support (formed of brass or the like) and the fine silver backing.

Said neck portion extends laterally at 20 and is formed integrally with a portion extending substantially vertically upward at 21; said lateral and vertical portions preferably having a relatively narrow slot 22 common thereto to increase the resiliency and flexibility thereof. A rectangular terminal portion 23 is formed integrally with vertical portion 21, said terminal portion having a tapped opening 24 therein to accommodate the shank of a binding screw 25 (Fig. 6).

As will be understood by those skilled in the art, the aforementioned flange or skirt 12 of the contact acts to minimize the likelihood of flow of any of the fused material (fine silver or brazing material), by capillary action or otherwise, to the contact surface 11 of contact 10; it being understood that surface 11 will be faced upwardly, during the welding or brazing operation. Also the skirt 12 serves to strengthen the contact as a whole and to prevent upward curling or separation thereof from the support portion 18 when in use. The additional engagement or connection afforded by the excess of fused silver or brazing material 27 (Fig. 8) between the skirt 12 of contact 10 and the peripheral edges 18ᵃ of portion 18 and the fused silver or brazing material serves to increase the area of electrical and mechanical contact between said parts, with a consequent increase in the rate of heat dissipation from the contact to its support in the event of arcing or heating when in use.

The layer of non-welding material 10ᵃ (Fig. 7) of the contact may, for example, consist of a mixture of 82 per cent by weight of Merck's precipitated silver powder and 18 per cent by weight of a mixture of cadmium oxide and cadmium sulphate, wherein 85 per cent of said last mentioned mixture is cadmium oxide and 15 per cent thereof is cadmium sulphate. A fine silver backing to have the same proportional degree of shrinkage as said portion composed of non-welding contact material will preferably be composed of a mixture of 80 per cent by weight of precipitated silver powder and 20 per cent by weight of crystalline silver powder In Fig. 8 I have shown the contact 10 attached to the portion 18 of support 16; the numeral 26 designating the space or clearance between the periphery of portion 18 and the inner surface 15 of the skirt 12 of the contact, whereby a receptacle for the excess of fused metal 27 is provided.

I claim:

1. A molded contact comprising an active part of non-welding material and a backing therefor of fusible metal integrally united therewith, said backing comprising a thin layer of said metal to provide for attachment of the contact to a metal support by welding or brazing, and said contact being so shaped as to provide a receptacle between the same and the metal support for all excess of fused metal or brazing material, thereby to guard against flow of the fused metal or brazing material onto said active part of the contact.

2. A molded and heat sintered contact comprising an active part of silver-base non-welding material and a backing therefor of fine silver integrally united therewith, said fine silver being in the form of a thin layer to provide for attachment of the contact to a metal support by welding or brazing, and said contact being so shaped as to provide a receptacle between the same and the metal support for all excess of fused silver or brazing material, whereby contamination of the active surfaces of said non-welding part by the fused silver or brazing material is avoided.

3. A heat-sintered electrical contact of non-welding character molded into the desired form under heavy pressure from a preformed body consisting of a relatively thick contact face portion composed of silver, cadmium oxide and cadmium sulphate in powder form in predetermined proportions and a relatively thin back portion composed of fine silver powders of different types, said last mentioned powders being so proportioned relatively to each other as to insure a like degree of shrinkage of all portions of said preformed body during sintering, said back portion of fine silver being adapted to provide for attachment of said contact to a metal support by welding or brazing, and said back portion including an integral depending skirt or flange adapted to substantially surround the metal support to prevent warping or curling of the contact and to provide a receptacle for all excess of fused silver or brazing material, thereby to guard against capillary flow of the fused silver or brazing material onto the non-welding portion of said contact.

4. A molded and heat-sintered contact comprising an active part of non-welding material backed with a bonded thin layer of fusible metal, said contact having a marginal skirt formed integrally with said active part and said bonded metal layer whereby the latter extends throughout the inner surface of said skirt, said bonded metal layer providing for attachment of the contact to a metal support by welding or brazing, and said skirt providing a receptacle for all excess of fused metal or brazing material, thereby to guard against flow of the fused metal or brazing material onto the operating surface of said non-welding material.

5. A pressure molded and heat-sintered contact comprising an upper active part of silver-base non-welding contact material and a lower or backing part consisting of a thin layer of fine silver, said contact having a downwardly extending marginal skirt formed integrally with said active part and said fine silver layer whereby the latter extends throughout the inner surface of said skirt, said fine silver layer providing for attachment of the contact to a suitably shaped metal support by welding or brazing, and said skirt providing between the same and the metal support a receptacle for all excess of fused silver or brazing material to insure against flow of the latter onto the exposed or operating surfaces of said non-welding material.

6. A pressure molded and heat-sintered contact comprising an upper active part of silver-base non-welding contact material and a lower or backing part consisting of a thin layer of fine silver, said contact having a downwardly extending marginal skirt formed integrally with said active part and said fine silver layer whereby the latter extends throughout the inner surface of said skirt, said fine silver layer providing for attachment of the contact to a suitably shaped metal support by welding or brazing, said skirt providing between the same and the metal support a receptacle for all excess of fused silver or brazing material to insure against flow of the latter onto the exposed or operating surfaces of said non-welding material, and said fused silver or brazing material cooperating with said skirt and said support to improve the electrical and mechanical connection between the latter and said contact.

7. A non-welding contact molded from powdered material with a backing of fusible metal, said backing comprising a thin layer of metal to be fused for attachment of the contact to a metal support, and said contact including an integral skirt at the margin thereof for stiffening of the contact and to provide a receptacle for all excess of the fused metal, thereby to guard against flow of the fused metal onto the non-welding portion of the contact.

8. A heat-sintered electrical contact molded under heavy pressure from powdered materials, said contact comprising an active part consisting of a silver-base non-welding material and a backing of fine silver, said backing providing for attachment of the contact to a metal support by welding or brazing, and said contact including an integral skirt at its margin for stiffening or reinforcing the same and to accommodate any excess of the fused silver or brazing material, thereby to substantially prevent flow of the fused silver or brazing material to the non-welding portion of said contact.

9. The combination with a metal contact support, of a contact comprising a non-welding body having bonded thereto a thin layer of fusible metal, said contact being attached to said support by fusion of said fusible metal, a marginal skirt formed integrally with said contact, at least the inner periphery of said skirt being composed of said fusible metal, and said skirt fitting onto a part of said support with sufficient clearance to afford a receptacle for all excess of fused metal, thereby to guard against flow of the fused metal to the body of said contact.

10. The combination with a metal contact support of good electrical conductivity, of a heat-sintered contact molded under heavy pressure from powdered materials and comprising a non-welding body having bonded thereto by the molding operation a thin layer of fine silver, said contact being attached to said support by welding or brazing through the medium of said layer of fine silver, said contact having an integral marginal skirt the outer peripheral surface of which is composed mainly of said non-welding material and the inner peripheral surface of which is composed of the fine silver of said layer, and said skirt fitting onto a part of said support with sufficient clearance to afford space for all excess of fused silver or brazing material, to thereby substantially completely insure against flow of the fused silver or brazing material onto said body of non-welding material.

HAROLD L. MEKELBURG.

REFERENCES CITED

The following references are of record in the file of this patent:

UNITED STATES PATENTS

| Number | Name | Date |
| --- | --- | --- |
| 1,047,524 | Honold | Dec. 17, 1912 |
| 1,181,742 | Coolidge | May 2, 1916 |
| 2,026,344 | Hollopeter | Dec. 31, 1935 |
| 2,255,120 | Kiefer et al. | Sept. 9, 1941 |
| 2,288,122 | Cox | June 30, 1942 |
| 2,298,999 | Allen | Oct. 13, 1942 |
| 2,307,668 | Cox | Jan. 5, 1943 |
| 2,347,815 | Ebert | May 2, 1944 |
| 2,425,053 | Swinehart | Aug. 5, 1947 |